United States Patent [19]

Adamoli, Jr. et al.

[11] Patent Number: 5,674,806
[45] Date of Patent: Oct. 7, 1997

[54] USING AGGREGATES CONTAINING CELLULOSE FOR AGRICULTURAL AND HORTICULTURAL PURPOSES

[76] Inventors: James R. Adamoli, Jr., 1326 Country Place Cir.; Mark A. Adamoli, 14316 Misty Meadow, both of Houston, Tex. 77079; James H. Edwards, Jr., 1116 E. Samford Ave., Auburn, Ala. 36830-6135

[21] Appl. No.: 479,163

[22] Filed: Jun. 7, 1995

Related U.S. Application Data

[63] Continuation-in-part of Ser. No. 228,230, Apr. 15, 1994.

[51] Int. Cl.⁶ .................................................. A01N 25/08
[52] U.S. Cl. .................................................. 504/116
[58] Field of Search .................................. 119/171, 172, 119/173, 174, 526; 71/12, 13, 23, DIG. 1; 504/102, 174, 116; A01N 25/08, 25/10

[56] References Cited

U.S. PATENT DOCUMENTS

| 2,827,368 | 3/1958 | Mortenson | 71/12 X |
|---|---|---|---|
| 3,955,536 | 5/1976 | Bunger | 119/51.02 X |
| 3,980,050 | 9/1976 | Neubauer | 119/172 |
| 4,007,708 | 2/1977 | Yacono | 119/172 |
| 4,162,153 | 7/1979 | Spector | 71/12 |
| 5,082,563 | 1/1992 | Webb et al. | 210/631 |
| 5,195,465 | 3/1993 | Webb et al. | 119/172 |
| 5,207,830 | 5/1993 | Cowan et al. | 119/171 X |
| 5,352,780 | 10/1994 | Webb et al. | 536/56 |
| 5,429,741 | 7/1995 | Webb et al. | 119/171 X |
| 5,486,068 | 1/1996 | Wilson | 71/23 X |

*Primary Examiner*—Robert P. Swiatek
*Assistant Examiner*—Elizabeth Shaw
*Attorney, Agent, or Firm*—Chamberlain, Hrdlicka, et al.; Wendy K. Buskop

[57] ABSTRACT

Aggregates formed from recycled paper can be used for weed control. Aggregates, which can be formed from recycled paper or gin trash, can be used poultry fitter to reduce frequency of cleaning, reduce odors and eliminate wet spots that lead to blistering of the feet and breast. Aggregate/poultry waste mixtures can be used for soil enhancement. Preferably, the aggregates for poultry litter are crumbled pellet or crumbled briquette.

14 Claims, 1 Drawing Sheet

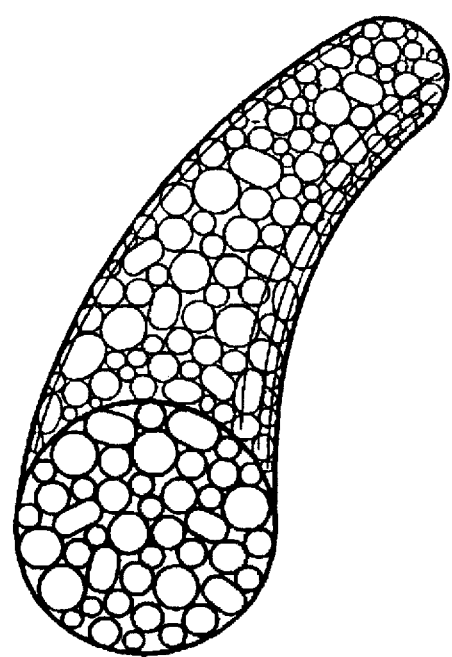

USING AGGREGATES CONTAINING CELLULOSE FOR AGRICULTURAL AND HORTICULTURAL PURPOSES

BACKGROUND OF THE INVENTION

This application is a continuation-in-part of application Ser. No. 08/228,230, filed on Apr. 15, 1994.

This invention relates to the use of paper products for soil enhancement and/or replacement and for weed and wind erosion control. In another aspect, the invention relates to the use of paper or cellulosic products in the raising of poultry.

Waste paper constitutes a large portion of the solid waste currently being disposed of in landfills. Some waste paper is managed by composting, but newsprint constitutes a large portion of the waste paper and is resistant to decomposition by composting. A technique to dispose of newsprint in large quantities would be very desirable.

Recycled paper is a rather sterile growth medium for plants. Also, waste paper mats when wetted, resulting in a poor medium for plant growth. A technique for providing waste paper in a form well suited for use as a plant growth medium would be very desirable.

It has been suggested to dispose of newsprint by application to agricultural soils. However, incorporating ground newsprint into the soil of agricultural land stunts crop growth, at least during the first few weeks. It appears that the waste paper may be competing with the plants for moisture and nitrogen. Further, ground newsprint releases aluminum into the soil, which has a long-lasting effect of stunting root growth. A technique for applying newsprint or other waste paper to agricultural soils in a manner that does not harm crop yields would be desirable.

Ground newsprint and other paper is also difficult to handle and apply in large quantities. It has a low bulk density and is subject to caking when exposed to moisture. A technique for making ground paper easier to handle and for applying ground paper to agricultural lands would also be desirable.

When applied to the surface of the soil, ground paper is easily blown by the wind. A technique to improve reliable placement of the paper for surface applications would be very desirable. Also, the 1985 Farm Bill requires all farmland that is classified as highly erodible by the Soil Conservation Service to reduce erosion to a manageable level by 1995. However, in many agricultural areas in the U.S. not enough plant residue is produced during the growing season to meet these Federal requirements. To achieve this goal, most farmers will have to plant cover crops during fallow periods and leave crop residue on the soil surface. An alternative method of providing surface cover would be desirable.

When buried in agricultural lands, ground newsprint is very resistant to degradation. A technique to improve the speed of degradation of buried ground newsprint would be desirable.

Newspaper sheets have been used in the past to control weeds but with many disadvantages. Newspaper sheets are not easily applied over large areas as each sheet must be physically placed. A method for controlling weeds in areas to be planted that allows for easy application would be very desirable.

Newspaper sheets are also very resistant to decomposition by soil microrganisms. This makes them undesirable once planting season begins. A method for controlling weeds in areas to be planted that easily assimilates into the soil would be desirable.

Newspaper sheets also can create barriers that emerging seedlings find difficult or impossible to penetrate. Consequently, newsprint may need to be removed before planting new seedlings. A method for controlling weeds in areas to be planted that does not need to be removed before planting occurs would be very desirable.

A major challenge facing producers of poultry, cattle, swine, horses and sheep is the disposal of the large mounts of animal waste generated. Poultry waste, especially, has a high nitrogen content. However, as a nutrient source for crops, poultry waste has proven to be a less effective source of nitrogen than commercial ammonium nitrate. This has sometimes lead to excessive applications of poultry waste to farmland, resulting in limited land use and/or contaminated runoffs. A technique for an environmentally sound soil treatment that utilizes animal waste has the potential for broad based benefits.

A problem facing producers of poultry is the frequency at which the poultry houses must be cleaned. Standard litter material, such as sawdust, wood chips and straw, have limited absorbency, which requires the poultry houses to be frequently cleaned. Further, materials such as sawdust and straw stick to the feet of poultry and thus get carried into the watering systems, necessitating the need for frequent cleaning of water troughs. A litter material that has enhanced absorbency and which doesn't stick to poultry feet would be desirable.

Poultry raised for human consumption must reach maturity with little to no blistering and scarring of the feet and breast in order to be sold for top dollar. Standard litter materials, such as sawdust, wood chips and straw, are not absorbent enough to eliminate blister causing "wet spots" in the poultry houses. A method to reduce or eliminate wet spots would be very desirable.

OBJECTS OF THE INVENTION

It is an object of this invention to provide cellulose, especially waste paper such as newsprint and phone books, gin trash and other organic materials, in a form so that it is highly suitable for horticultural and agricultural uses.

It is another object of this invention to provide a plant growth medium comprised of a cellulose product.

It is yet another object of this invention to provide a technique for using animal waste for horticultural and agricultural purposes.

It is a still further object of this invention to provide a technique for reducing soil erosion with paper products, especially waste paper products.

It is another object of this invention to provide a method for weed control using paper products, especially waste paper products.

It is further an object of this invention to provide a method for weed control using paper products which does not stunt the root growth of desired plantings.

It is a further object of this invention to provide a soil amendment technique using paper products, especially waste paper products.

It is a further object of this invention to provide a method for covering a poultry house with litter material that has good absorbency and which doesn't stick to poultry feet.

It is a further object of this invention to provide a method to raise poultry to adulthood with minimal blisters of the feet or blisters and ulcers of the breast.

It is a further object of this invention to provide a method for disposing of poultry waste that is environmentally sound and beneficial to the poultry farmer.

The potential benefits from application of as cellulosic materials, such as waste paper, gin trash and other organic materials, to farmland as a soil amendment is dependent on geographical location. In the Southeast, incorporation of newsprint can improve the physical and chemical properties of soil, thus increasing soil aggregation and infiltration while reducing sediment loss by surface runoff. In drier regions, newsprint applications may have the added benefits of conserving soil water resources while reducing sediment loss by wind erosion.

SUMMARY OF THE INVENTION

In one embodiment of the invention, there is provided an aggregate of consolidated finely divided or comminuted particles containing cellulosic material and complexing agents. Cellulosic materials, particularly paper, contains aluminum which is released into the soil when the material degrades. The aluminum stunts root growth of new plantings. The complexing agents, such as phosphorus and soluble organic acids, combine with aluminum in the cellulosic material, keeping the aluminum from entering the soil and stunting plant growth.

In another embodiment of the invention, there is provided a method for controlling weed growth. Aggregates comprising consolidated finely divided or comminuted particles containing cellulosic material are used to cover the area where weed control is desired. The aggregates comprise a cellulosic material and have an apparent density in bulk in the range of from about 140 kg/m$^3$ to about 830 kg/m$^3$ at a moisture level of about 20% by weight. The aggregates may contain complexing agents to tie up aluminum which, when released from paper products, stunts root growth.

In yet another embodiment of the invention, them is provided a method for covering the floor of a poultry house with aggregates comprising consolidated finely divided or comminuted particles containing cellulosic material. It has been found that aggregates made from finely divided or comminuted particles containing cellulosic material have several advantages over standard litter materials such as sawdust, wood chips and straw. For example, aggregates made from paper, gin trash or other organic materials have a lower apparent bulk density which results in greater absorbent characteristics. Greater absorbency appears to decrease the frequency at which the poultry litter must be replaced. Further, increased absorbency appears to lower the odor associated with poultry litter and, consequently, should lower the overall fly population around a poultry house.

In still another embodiment of the invention, there is provided a method for housing poultry on a floor covered with aggregates comprising consolidated finely divided or comminuted particles containing cellulosic material, wherein the aggregates are selected from the group consisting of crumbled aggregate and small pellets having a major dimension less than about 10 cm and wherein the aggregates have the characteristic of maintaining integrity upon liquid absorption. As previously discussed, aggregates made from consolidated finely divided or comminuted particles containing cellulosic material have greater absorbency than standard litter materials such as sawdust, wood chips and straw. This characteristic results in an overall reduction in the occurrence of wet spots which cause blistering and scaring of chicken feet and ulcering of chicken breasts, both detrimental to the market value of adult chickens intended for human consumption. Further, aggregates made from consolidated finely divided or comminuted particles containing cellulosic material have been found to be less adherent to poultry feet, resulting in less carryover of litter into the poultry water supply.

In yet another embodiment of the invention, there is provided a method for collecting poultry waste in a poultry house. The wastes are collected in aggregates comprising consolidated finely divided or comminuted particles, thus forming an aggregate/poultry waste mixture. The aggregate/poultry waste mixture is removed from the poultry house and optionally processed. It may be further utilized as a soil amendment, peat moss replacement or livestock feed. Poultry waste, which contains high amounts of nitrogen is frequently disposed of by placing it on a portion of the poultry farmer's land. The high nitrogen in the waste causes land utilization and runoff problems. Aggregates made from consolidated finely divided or comminuted particles containing cellulosic material, in particular paper, have been found to lower the nitrogen level of poultry waste to a level which allow the aggregate/waste mixtures to be distributed over farm lands as soil amendment or to be used similarly to peat moss. Further, the ammonia in poultry waste is expected to break bonds in the aggregates, rendering the aggregate/waste mixtures digestible by livestock, such as cattle, thus providing an additional means of disposal.

BRIEF DESCRIPTION OF THE DRAWINGS

The FIGURE is a pictorial representation of an aggregate containing ground paper according to one embodiment of the invention.

DETAILED DESCRIPTION OF THE PREFERRED EMBODIMENTS

In one embodiment of the invention, there is provided an aggregate containing ground paper. Generally, the paper is ground to a screen size of 10 cm or less, usually, to a screen size of 3 cm or less, and preferably to a screen size of between about 0.2 and about 2 cm. Hammer mills can be used. Any paper can be used, but the invention will probably have its greatest benefit when applied to recycled paper, including newspapers, telephone books, magazines, computer paper, corrugated paper, etc. Waste or excess paper or pulp recovered from manufacturing processes can also be used. The selection of the desired paper is an economic one, rather than a technical one.

By aggregate is meant a cluster of ground paper particles. Preferably, the aggregate is consolidated by compacting ground paper particles under conditions of added moisture, for example by pelletizing or briquetting, to form pellets or briquettes of ground paper.

The formation of pellets of ground paper is known in the paper recycling industry. A pelletizing machine which extrudes pellets in the form of an extrudate has been used with good results. It is also believed that a briquetting machine, such as is used for the manufacture of charcoal briquettes, would also be useful, as well as equipment for pelletizing animal feeds. For certain applications, however, the aggregate may be in the form of crumbled aggregate or broken cake. For these applications, broken up pellets or briquettes form a highly suitable material.

The particle size and shape of the aggregates depends on the desired application. For application on the surface of the soil for weed control, and as a soil substitute, a relatively small particle size is believed best suited. For deep burial, larger aggregates may be used. For application to mitigate wind erosion and/or form a ground cover to retain soil moisture, an intermediate size is probably best suited. Where the pellets are to be tilled into the soil, a wide range of sizes are suitable, although small particles will be assimilated more quickly than larger ones.

Generally speaking, the particle size, as expressed in terms of average volume of a major portion of the aggregates, can range from about 0.02 cc to about 500 cc. Usually, the aggregates will have a volume in the range of from about 0.1 cc to about 100 cc. Preferably, the aggregates will have a volume in the range of from about 0.5 cc to about 15 cc. However, for some applications, such as soil replacement or weed control, it may be desirable to form mixtures of aggregates with a volume in the range of 0.5 cc to 150 cc with smaller aggregates which may be in crushed or crumbled form such as those having a size in the range of from about 0.02 cc to about 0.5 cc., although even smaller aggregates such as those having a volume as small as 0.005 cc may also be used. For use as a growth medium, the aggregates will generally have a volume of less than about 2 cc.

The aggregates can also be described as having a major dimension and a minor dimension. The minor dimension is preferably less than 5 cm to aid in breakdown and assimilation by the soil and the major dimension is preferably less than about 30 cm to aid in mixing in the soil with standard agricultural implements. The minor dimension is preferably greater than about 0.15 cm and the major dimension is preferably greater than about 0.3 cm for reasons of economy in production and handling.

Generally speaking, the aggregates are produced in pellet or briquette form, and can have any desired configuration, such as circular, square, or flattened cross section. The currently preferred aggregate is presently an elongated extrudate with a circular cross-section, because it has been tested with good results. The presently preferred aggregate is generally arcuately shaped and has a length in the range of about 0.1 to about 30 cm and a diameter in the range of from about 0.1 to about 5 cm. Even more preferably, the extrudate has a length in the range of from about 1 to about 15 cm and a diameter in the range of from about 0.2 to about 2.0 cm. An extrudate having a length closely encompassed by the range of from about 2 to about 5 cm and a diameter in the range of from about 0.3 to about 1.6 cm has been tested in several applications with good results. For the mitigation of wind erosion it is expected that aggregates having a high surface area/volume ratio will provide the most desirable results.

For agricultural applications the aggregates will generally be applied in an amount of between about 1000 kg/ha to about 28,000 kg/ha, although where simple disposal of waste paper is the objective, the amounts could be on either side of this range. Usually, the aggregates are applied in an amount of between about 1000 kg/ha to about 20,000 kg/ha. For annual use, it is expected that the aggregates will be applied in an amount of between about 3,000 kg/ha to about 8,000 kg/ha although greater amounts than this such as in the range of from about 6,000 kg/ha to 20,000 kg/ha, are expected to be beneficial when the objective is the mitigation of wind erosion. For wind erosion control, ground cover of between about 20% and about 40% should provide good results. Smaller aggregates are more economical for this application than larger ones since they have a high surface area/volume ratio, but the aggregates should have sufficient mass to avoid wind displacement. For weed control, smaller amounts of aggregate can be used, such as in the range of from about 1,000 kg/ha to 6,000 kg/ha, by applying the aggregate along the base of the growing plants, optionally in a shallow trench to aid in placement.

The aggregates can be applied to the soil in any desired manner. Generally, the aggregates will be broadcast on the soil surface, and this is the preferred technique where the objective is control of weeds and wind erosion. Generally speaking, for quickest assimilation, it is desirable to mix the aggregates with the soil. This can be accomplished by conventional tilling after the aggregates have been broadcast on the soil surface. Where it is desired to reduce soil density, the aggregates can be worked deeply into the soil, but will generally be tilled into the soil to a depth of no greater than 61 cm. Beneficial results can also be obtained by burying a mixture of aggregates and soil in a trench and where soil compaction severely limits plant root depth, this technique provides good results. Usually, however, the aggregates will be tilled into the soil to a depth of no greater than about 15 cm because this can be accomplished using standard farm implements.

As mentioned, one of the effects of tilling the aggregates into the soil is a reduction in soil density. The aggregates generally have an apparent bulk density in the range of from about 100 kg/m$^3$ to about 830 kg/m$^3$ at a moisture level of about 20% by weight. Usually, the aggregates have an apparent bulk density in the range of from about 180 kg/m$^3$ to about 550 kg/m$^3$ at a moisture level of about 20% by weight. Larger pellet aggregates have bulk densities in the higher end of the ranges given. Crumbled aggregates have bulk densities in the lower end of the ranges given.

The aggregates which have been incorporated into the soil apparently compete with growing plants for nitrogen. This prevents the pellets from being beneficial to the plants for an incubation period of several weeks. This problem can be overcome by applying the pellets several weeks before planting season, such as in the fall, or by applying a nitrogen source to the soil, either directly or by incorporation into the pellets. Commercial fertilizers can be used. When commercial fertilizers are used, they are generally selected from ammonium nitrate, ammonium sulfate and urea. Application is in an mount sufficient to provide a C:N atomic ratio between nitrogen from the nitrogen source and carbon from the ground paper of between about 20:1 to about 60:1. Animal wastes are the preferred source of nitrogen, because they seem to be more rapidly assimilated. In order of decreasing preference, poultry waste, cattle manure, swine manure, horse manure and sheep manure may be used. A sufficient amount is applied to provide a C:N atomic ratio between nitrogen from the nitrogen source and carbon from the ground paper of between about 20:1 to about 60:1, most preferably about 30:1.

In the most preferred embodiment of the invention, the nitrogen source is incorporated into the pellets. The same nitrogen sources can be used as mentioned above. They are incorporated into the aggregates during the manufacturing operation to provide a C:N atomic ratio between nitrogen from the nitrogen source and carbon from the ground paper of between about 20:1 to about 60:1. In this embodiment of the invention, the aggregates will generally comprise from about 1% to about 3% of nitrogen, on an elemental basis. Where animal waste is used, the processing temperatures should be kept low in order to preserve sufficient microorganisms to speed assimilation into the soil.

Cellulosic materials, particularly paper, contain aluminum which is released into the soil when the material degrades. The aluminum both interferes with beneficial bacteria and stunts root growth. Once the roots of plants have been attacked, they cannot recover. In another embodiment of the invention, there is provided an aggregate of consolidated finely divided or comminuted particles containing cellulosic material and complexing agents which have the characteristic of combining with aluminum. The aggregates have an apparent bulk density in the range of from about 140 kg/m³ to about 550 kg/m³ at a moisture level of about 20% by weight and are preferably selected from the group consisting of paper, gin trash and plant material. The complexing agents, such as phosphorus and soluable organic acids, combine with aluminum in the cellulosic material, keeping the aluminum from entering the soil and stunting plant growth. At the same time, the complexing agents do not interfere with the microbial activity of helpful bacteria and microbes.

In another embodiment of the invention, there is provided a method for controlling weed growth. The invention has particular application for farm acreage, nurseries and gardens. Aggregates comprising consolidated finely divided or comminuted particles containing cellulosic material are used to cover the area where weed control is desired. The aggregates comprise a cellulosic material and have an apparent density in bulk in the range of from about 140 kg/m³ to about 830 kg/m³ at a moisture level of about 20% by weight. In a preferred embodiment, the aggregates have a bulk density in the range of from about 180 kg/m³ to about 550 kg/m³ at a moisture level of about 20% by weight. Preferably, the cellulosic material is waste material such as paper, gin trash and plant material. Weeds tend to germinate in the top 1 cm of soil. The aggregates have good absorption characteristics and help starve the weeds of moisture. Good weed control has been seen when the aggregates were dispersed on the ground in the range of about 1,000 kg/ha to about 6,000 kg/ha.

The preferred aggregate for weed control use has a volume in the range of about 0.5 cc to about 150 cc. However, larger aggregates having a volume of about 0.5 cc to about 150 cc may be mixed with smaller aggregates having a volume of about 0.005 cc to about 0.5 cc with good results. When a mixture of aggregates is used, the smaller aggregates preferably have a volume in the range of about 0.02 cc to about 0.5 cc.

The aggregate size and density allows the aggregates to be easily applied to the desired area. Simple broadcasting will work. The aggregate size and density also allows the aggregates to breakdown and assimilate into the soil, allowing the areas to be planted without removal of the weed controlling aggregates.

As previously discussed, a problem with the application of newsprint to the soil is that the newsprint releases aluminum into the soil as it breaks down and assimilates. The aluminum has the long lasting effect of stunting the root growth of the desired plantings. When weed control is used on areas which are planted or are to be planted, complexing agents may be added to the aggregates. The complexing agents are preferably added during the pelletizing process; however, the complexing may be broadcast onto the soil along with the aggregates. The complexing agents combine with the aluminum to stop or slow down the release of aluminum as the aggregates decompose and assimilate into the soil. Phosphorus and soluble organic acids have been shown to be effective in tying up aluminum. A good result has been seen when the complexing agents have been added in the range of from about 15 kg/ha to about 30 kg/ha.

In still another embodiment of the invention, aggregates made from consolidated finely divided or comminuted particles containing cellulosic material can be used as a litter material to cover poultry house floors or as bedding material. These aggregates, particularly aggregates made from paper, gin trash or other organic materials, exhibit enhanced absorbency. The enhanced absorbency appears to decrease the frequency at which the litter needs to be removed and replaced. Further, enhanced absorbency reduces poultry house odors, which should reduce the fly population around poultry houses. The poultry waste/aggregate mixture formed when the aggregates are used for litter can then be removed, optionally processed and used as soil amendment, peat moss replacement or livestock feed.

When the aggregates are to be used in poultry houses, smaller crumbled aggregates or pellet sized aggregates are believed best suited. For application as poultry house litter, it is believed that aggregates selected from the group consisting of crumbled aggregates and small pellets having a major dimension of less than about 10 cm will be the most useful for the application.

This will allow for adequate floor coverage for insulation without creating feeding problems for young chicks. As discussed previously, crumbled aggregates may be made from large pellets or briquettes.

The aggregates can be applied to the floor of a poultry house in any of the usual manners for applying litter. In one embodiment of the invention, aggregates comprising consolidated finely divided or comminuted particles containing cellulosic material are dispersed on the floor of a poultry house. A major portion of the aggregates have an apparent bulk density in the range of about 20 kg/m³ to about 550 kg/m³ at a moisture level of about 20% by weight. In a preferred embodiment of the invention, crumbled aggregate or small pellet sized aggregates having a major dimension of less than about 10 cm and made from paper, gin trash or plant materials are dispersed on the poultry house floor to a depth of from about 0.318 cm to about 30.5 cm. In one embodiment of the invention the aggregates contain an insecticide to help eliminate a common beetle which lives in poultry litter.

Poultry for human consumption require special care to increase the market value of the adult fowl. Large mounts of water are used in the poultry houses, resulting in "wet spots" in the litter. When poultry are exposed to litter containing wet spots, their feet become susceptible to blistering and their breasts can become blistered or ulcerated. Blistering and ulcerations, and their resultant scarring, reduce the market value of poultry both in the United States (where the breast meat has high market value) and elsewhere (such as the Orient where poultry feet are consumed). Current poultry litter materials, such as sawdust, wood chips and straw provide adequate insulation but have fairly low absorption characteristics. As previously discussed, aggregates made from consolidated finely divided or comminuted particles containing cellulosic material display enhanced absorbency, thus reducing the occurrence of wet spots and decreasing the likelihood of the poultry developing blisters and ulcers.

Poultry houses are used to raise fowl from young chicks to market size birds. Young chicks walk on the floor of the poultry house and then stand in their water in order to drink. Current litter materials, such as sawdust, wood chips or straw, stick to the feet of the young chicks, thus ending up in the water supply once the chicks have drunk. This results in the need for the water troughs to be cleaned on an average of once daily. Aggregates made from consolidated finely divided or comminuted particles containing cellulosic material have been shown to resist adhering to the chicks feet, resulting in the water troughs only having to be cleaned once every eight days.

In one embodiment of the invention a method is provided for raising poultry on a floor covered with aggregates comprising consolidated finely divided or comminuted particles containing cellulosic material. The aggregates are selected from the group consisting of crumbled aggregate and small pellets having a major dimension less than about 10 cm and wherein the aggregates have the characteristic of maintaining integrity upon liquid absorption. The aggregates are usually dispersed at a rate of about 0.61 kg to about 830 kg per square meter of poultry house floor to allow for adequate insulation for young chicks. In the most preferred embodiment, the aggregates comprise a cellulosic material selected from the group consisting of paper, gin trash and plant material.

Once the poultry waste is collected, there is a problem in dispensing the waste. Poultry waste has a nitrogen content that is too high to be used alone or untreated on crops. Farmers tend to deposit the untreated waste upon portions of their lands which reduces the amount of land that can be used for growth purposes and raises potential environmental issues due to high nitrogen levels. As has been mentioned, poultry waste can be mixed with aggregate to provide a soil amendment or peat moss replacement of proper nitrogen levels for enhanced plant growth. In one embodiment of the invention, poultry waste is collected, in a poultry house, in aggregates comprising consolidated finely divided or comminuted particles containing cellulosic material, wherein the aggregates have the characteristic of combining with nitrogen and, thus, lowering the free ionic nitrogen level of poultry waste, thus reducing the availability of the nitrogen form which leaches into the soil. The poultry waste mixes with the aggregate forming an aggregate/poultry waste mixture. This mixture is then removed from the poultry house and, following optional processing, is dispersed as soil amendment or peat moss replacement.

In another embodiment of the invention, the aggregate/poultry mixture is removed from the poultry house and, following optional processing, dispersed as livestock feed. Livestock, such as cattle, can digest certain poultry waste/litter mixtures. For example, aggregates made from paper can be digested if the bonds which hold the paper together are broken down. It is believed that the ammonia in poultry waste should break down the paper bonds.

We claim:

1. An aggregate comprising:
  consolidated finely divided or comminuted particles containing cellulosic material;
  and complexing agents;
  wherein said aggregate has an apparent bulk density in the range of from about 140 kg/m$^3$ to about 550 kg/m$^3$ at a moisture level of about 20% by weight; and
  wherein said complexing agents have the characteristic of combining with aluminum.

2. An aggregate as in claim 1 wherein said complexing agents are selected from the group consisting of phosphorus and soluable organic acids.

3. An aggregate as in claim 2 wherein said aggregate is selected from the group consisting of paper, gin trash and plant material.

4. A method for controlling weed growth comprising covering an area of ground with aggregates comprising consolidated finely divided or comminuted particles containing cellulosic material, wherein said aggregates have an apparent bulk density in the range of from about 140 kg/m$^3$ to about 830 kg/m$^3$ at a moisture level of about 20% by weight.

5. A method as in claim 4 wherein the aggregates have an apparent bulk density in the range of about 180 kg/m$^3$ to about 550 kg/m$^3$ at a moisture level of about 20% by weight.

6. A method as in claim 5 wherein the aggregates have a volume in the range of about 0.5 cc to about 150 cc.

7. A method as in claim 6 further comprising forming a mixture of larger aggregates having a volume of about 0.5 cc to about 150 cc with smaller aggregates having a volume of from about 0.005 cc to about 0.5 cc.

8. A method as in claim 7 wherein the smaller aggregates have a volume in the range of from about 0.02 cc to about 0.5 cc.

9. A method as in claim 8 wherein the aggregates further comprise a cellulosic material selected from the group consisting of paper, gin trash and plant material.

10. A method as in claim 4 wherein the aggregates further comprise complexing agents, wherein said complexing agents have the characteristic of combining with aluminum.

11. A method as in claim 10 wherein the complexing agents are selected from the group consisting of phosphorus and soluble organic acids.

12. A method for controlling weed growth comprising covering an area of ground with aggregates comprising consolidated finely divided or comminuted particles containing cellulosic material, wherein said aggregates have an apparent bulk density in the range of from about 140 kg/m$^3$ to about 830 kg/m$^3$ at a moisture level of about 20% by weight;
  wherein the aggregates have an apparent bulk density in the range of from about 180 kg/m$^3$ to about 550 kg/m$^3$ at a moisture level of about 20% by weight;
  wherein the aggregates have a volume in the range of about 0.5 cc to about 150 cc;
  forming a mixture of larger aggregates having a volume of about 0.5 cc to about 150 cc with smaller aggregates having a volume of from about 0.005 cc to about 0.5 cc;
  wherein the smaller aggregates have a volume in the range of from about 0.02 cc to about 0.5
  wherein the aggregates further comprise a cellulosic material selected from the group consisting of paper, gin trash and plant material;
  dispersing the aggregates on the ground in the range of about 1,000 kg/ha to about 6,000 kg/ha.

13. A method for controlling weed growth comprising covering an area of ground with aggregates comprising consolidated finely divided or comminuted particles containing cellulosic material, wherein said aggregates have an apparent bulk density in the range of from about 140 kg/m$^3$ to about 830 kg/m$^3$ at a moisture level of about 20% by weight;
  wherein the aggregates have an apparent bulk density in the range of from about 180 kg/m$^3$ to about 550 kg/m$^3$ at a moisture level of about 20% by weight;
  wherein the aggregates have a volume in the range about 0.5 cc to about 150 cc;
  forming a mixture of larger aggregates having a volume of about 0.5 cc to about 150 cc with smaller aggregates having a volume of from about 0.005 cc to about 0.5 cc;
  wherein the smaller aggregates have a volume in the range of from about 0.02 cc to about 0.5 cc;
  wherein the aggregates further comprise a cellulosic material selected from the group consisting of paper, gin trash and plant material:
  dispersing the aggregates on the ground in the range of about 1,000 kg/ha to about 6,000 kg/ha;
  dispersing complexing agents in the ground in a range of about 15 kg/ha to about 30 kg/ha, wherein said complexing agents have the characteristic of combining with aluminum.

14. A method for controlling weed growth comprising covering an area of ground with aggregates comprising consolidated finely divided or comminuted particles containing cellulosic material, wherein said aggregates have an apparent bulk density in the range of from about 140 kg/m$^3$ to about 830 kg/m$^3$ at a moisture level of about 20% by weight;

wherein the aggregates have an apparent bulk density in the range of from about 180 kg/m$^3$ to about 550 kg/m$^3$ at a moisture level of about 20% by weight;

wherein the aggregates have a volume in the range of about 0.5 cc to about 150 cc;

forming a mixture of larger aggregates having a volume of about 0.5 cc to about 150 cc with smaller aggregates having a volume of from about 0.005 cc to about 0.5 cc;

wherein the smaller aggregates have a volume in the range of from about 0.02 cc to about 0.5 cc;

wherein the aggregates further comprise a cellulosic material selected from the group consisting of paper, gin trash and plant material;

dispersing the aggregates on the ground in the range of about 1,000 kg/ha to about 6,000 kg/ha;

dispersing complexing agents in the ground in a range of about 15 kg/ha to about 30 kg/ha, wherein said complexing agents have the characteristic of combining with aluminum;

wherein the complexing agents are selected from the group consisting of phosphorus and soluble organic acids.

\* \* \* \* \*